Oct. 18, 1932.  J. F. DUFFY  1,883,737
MAT
Filed July 31, 1930
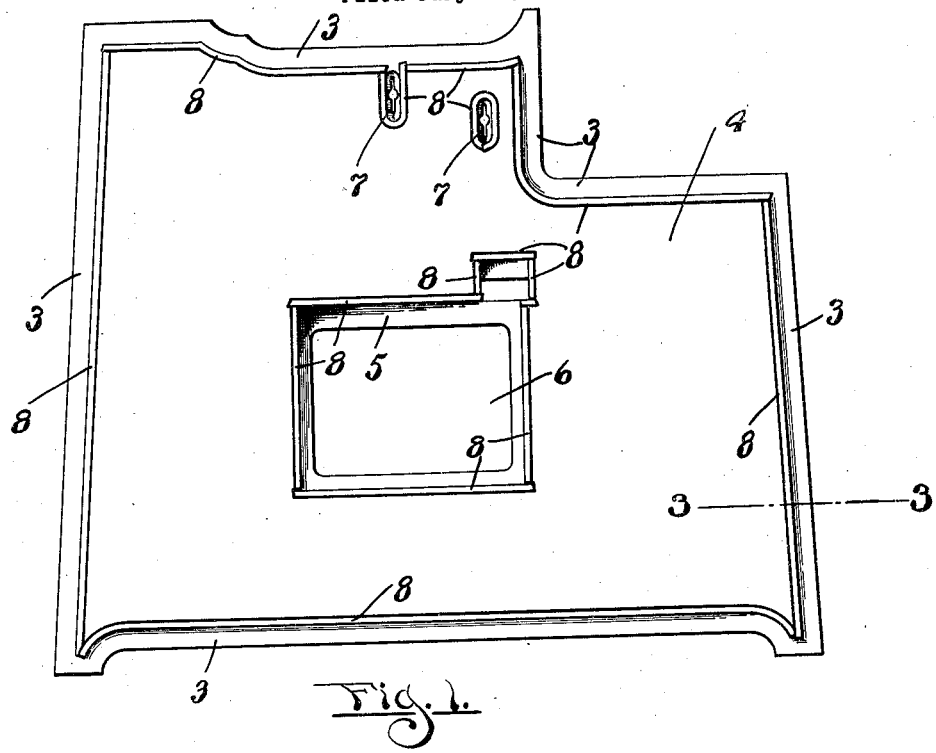
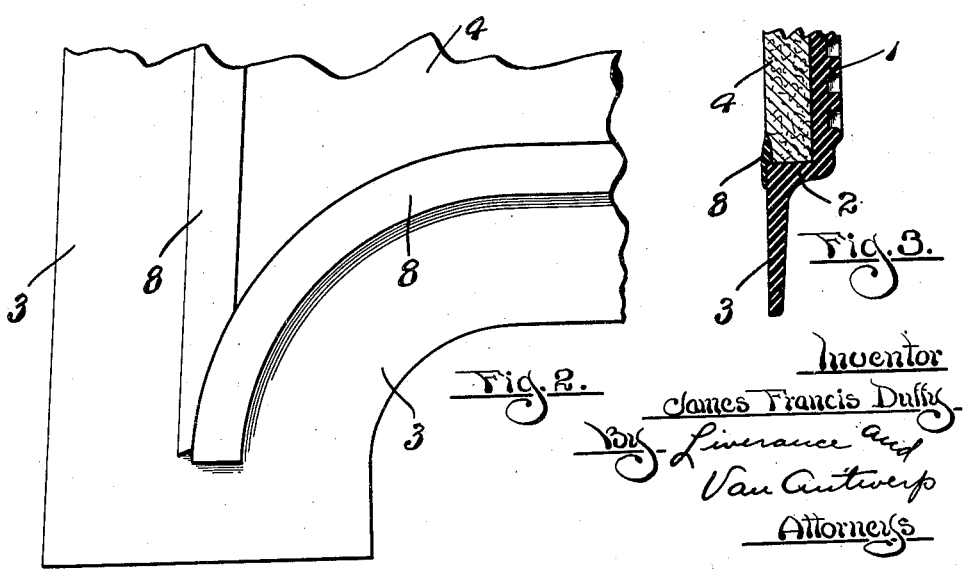
Inventor
James Francis Duffy
By Liverance and
Van Antwerp
Attorneys Patented Oct. 18, 1932

1,883,737

UNITED STATES PATENT OFFICE

JAMES FRANCIS DUFFY, OF HOLLAND, MICHIGAN, ASSIGNOR TO DUFFY MANUFACTURING COMPANY, OF HOLLAND, MICHIGAN, A CORPORATION OF MICHIGAN

MAT

Application filed July 31, 1930. Serial No. 471,924.

This invention relates to mats being particularly concerned with a novel construction of mat primarily for use in automobiles, though in no sense restricted in its use to automobiles alone, as the mat is available for use on floors or the like.

It is a primary object and purpose of the present invention to provide a relatively thick mat which has a rubber wearing surface and a rubber border integral with the wearing surface, the border depending from the edges of the covering or wearing surface and thereby providing a shallow recess substantially coextensive with the mat at its underside, in which recess a filler, preferably of sponge rubber, is to be located and secured, thereby making a soft pliable mat structure and one which is very durable and is particularly useful.

I have, therefore, made application for a patent, having Ser. No. 381,990, filed July 29, 1929, and the present invention is directed to various improvements in the mat structure there disclosed, and for the purpose of specifically claiming the sponge rubber filler construction, division with respect to which was required in my prior application. In the securing of a sponge rubber filler in the large shallow under recess of the mat, I have found that it was not practical to rely alone upon the cemented or other direct connection of the edges of the filler to the sides of the recess, and have provided a simple yet at the same time particularly practical and easily constructed means of reinforcing and insuring the connection of the filler to the outer rubber material of the mat so that there will be no separation at the joints between the same under the somewhat severe usage to which the mat is subjected in service.

Many other objects and purposes than those stated, for the purpose of providing a mat construction economical to produce and providing a relatively heavy and thick mat at low cost, will appear as understanding of the invention is had from the following description, taken in connection with the accompanying drawing, in which:

Fig. 1 is an under plan view of an automobile mat made in accordance with my invention.

Fig. 2 is a fragmentary enlarged under plan view of a corner portion of the mat, the enlarged view being for a better disclosure and, Fig. 3 is a fragmentary section taken substantially on the plane of line 3—3 of Fig. 1.

Like reference characters refer to like parts in the different figures of the drawing.

In the construction of the mat an outer comparatively thin covering or wearing top 1 for the mat is provided which, at its outer surface, may be ribbed, corrugated, or otherwise constructed to obviate slipping. Extending at right angles from the edges of this outer top or covering 1 are flanges or a border 2 with which outwardly extending horizontal webs 3 are integrally formed.

The mat is of any desired outer dimensions to conform to the space in the automobile which it is to fit. There is provided at the underside of the mat with such construction, a shallow recess nearly coextensive with the mat in which a filler 4 of sponge rubber is located and secured, preferably by suitable cementing.

For automobile use, the mat has various openings therethrough, and the rubber 5 is shown as located around one of said openings 6 and extends inwardly so that its free edges lie in substantially the same plane with the undersides of the projecting webs 3. Likewise, the openings 7 are similarly made and the rubber may extend across said openings and be slitted longitudinally, as shown, for the passage of the clutch and brake pedals, while through the opening 6, the gear shift and emergency brake levers extend in the usual manner in mats used in the front or driving compartments of automobiles.

The filler 4 of sponge rubber has its edges bearing against the inner sides of the parts 2 of the mat, and also against the inner sides of the surrounding ribs of rubber which are around the openings 6 and 7. The joints with my invention are covered by strips 8 of rubber which extend partly over the filler 4 and partly over the adjacent rubber of the parts 2, 5, and the like, and are secured permanently in place by vulcanizing the same inseparably to the sponge rubber filler 4 and the rubber of which the outer covering and surrounding ribs for the openings of the mat are made.

A mat constructed as described, is insured against any separation of the filler 4 from the rubber outer covering, and the joints at the edges of the filler are held against opening. It has been found that by covering the joints with the rubber strips 8 and permanently securing them in place, an especially durable construction is made particularly with respect to the prevention of any separation of the filler of sponge rubber from the remainder of the mat. It has made the mat one of great practical utility.

The invention is defined in the appended claim, and is to be considered comprehensive of all forms of structure coming within its scope.

I claim:

A mat comprising a relatively thick filler and a rubber covering secured thereto having an upper portion co-extensive with the upper side of said filler, said covering also having a relatively thin flexible marginal web, a substantially vertical border portion between said web and upper portion and narrow strip means fastened along the inner edge of the web and the outer edge of the filler member whereby the border portion is prevented from bulging outwardly.

In testimony whereof I affix my signature.

JAMES FRANCIS DUFFY.